United States Patent
Sommer et al.

(10) Patent No.: US 8,939,651 B2
(45) Date of Patent: Jan. 27, 2015

(54) MULTI-ROW TAPERED ROLLER BEARING AND TRANSMISSION HAVING SUCH A BEARING

(75) Inventors: Joachim Sommer, Schweinfurt (DE); Armin Olschewski, Schweinfurt (DE); Rainer Spies, Donnersdorf (DE); Arno Stubenrauch, Aidhausen (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/636,354

(22) PCT Filed: Mar. 21, 2011

(86) PCT No.: PCT/EP2011/054203
§ 371 (c)(1),
(2), (4) Date: Feb. 4, 2013

(87) PCT Pub. No.: WO2011/120833
PCT Pub. Date: Oct. 6, 2011

(65) Prior Publication Data
US 2013/0202238 A1 Aug. 8, 2013

(30) Foreign Application Priority Data
Apr. 1, 2010 (DE) .......................... 10 2010 013 627

(51) Int. Cl.
*F16C 19/38* (2006.01)
*F16C 33/66* (2006.01)
(Continued)

(52) U.S. Cl.
CPC ............... *F16C 19/385* (2013.01); *F16C 19/38* (2013.01); *F16C 19/388* (2013.01); *F16C 25/08* (2013.01); *F16C 2361/61* (2013.01)

USPC ........... 384/565; 384/470; 384/475; 384/514; 384/570; 384/571

(58) Field of Classification Search
CPC ........ F16C 19/26; F16C 19/38; F16C 19/385; F16C 19/388; F16C 19/364; F16C 33/605
USPC ......... 384/499, 564–565, 570–571, 619, 470, 384/475, 514
See application file for complete search history.

(56) References Cited

U.S. PATENT DOCUMENTS

| | | | |
|---|---|---|---|
| 2,068,198 | A | 1/1937 | Seifarth |
| 2,130,258 | A | 9/1938 | Baker et al. |

(Continued)

FOREIGN PATENT DOCUMENTS

| | | | |
|---|---|---|---|
| BE | 662226 A | | 8/1965 |
| DE | 102005022205 A1 | | 11/2006 |

(Continued)

*Primary Examiner* — Marcus Charles
(74) *Attorney, Agent, or Firm* — Bryan Peckjian; SKF USA Inc. Patent Department

(57) ABSTRACT

A bearing assembly includes at least first, second and third raceway elements that are each separable from each other and at least first, second and third rows of truncated-cone-shaped rolling elements. The first and second raceway elements are disposed side-by-side in an axial direction of the bearing assembly and oppoe the third raceway element in a radial direction of the bearing assembly. The first and second rows of rolling elements are disposed between the first raceway element and the third raceway element and the third row of rolling elements is disposed between the second raceway element and the third raceway element. The rolling elements of the first and second rows commonly roll on a first raceway of the third raceway element and the rolling elements of the third row roll on a second raceway of the third raceway element, which is not parallel to the first raceway.

19 Claims, 8 Drawing Sheets

(51) Int. Cl.
*F16C 19/28* (2006.01)
*F16C 25/08* (2006.01)

(56) References Cited

U.S. PATENT DOCUMENTS

| | | | |
|---|---|---|---|
| 3,312,511 A | 4/1967 | Synek | |
| 4,235,485 A | 11/1980 | Reiter | |
| 5,975,762 A * | 11/1999 | Ai | 384/551 |
| 6,866,423 B2 * | 3/2005 | Faltus et al. | 384/559 |
| 7,287,911 B2 * | 10/2007 | Dodoro et al. | 384/517 |
| 7,871,202 B2 * | 1/2011 | Roemling | 384/571 |
| 2005/0031240 A1 * | 2/2005 | Dodoro et al. | 384/494 |
| 2008/0193066 A1 * | 8/2008 | Roemling | 384/128 |
| 2009/0238509 A1 * | 9/2009 | Abraham et al. | 384/613 |
| 2010/0098365 A1 * | 4/2010 | Im et al. | 384/512 |
| 2011/0027086 A1 * | 2/2011 | Zeidlhack | 384/548 |

FOREIGN PATENT DOCUMENTS

| | | | |
|---|---|---|---|
| GB | 724535 A | 2/1955 | |
| JP | 2003184885 A | 7/2003 | |
| JP | 2005331054 A | 12/2005 | |
| WO | WO 2008044880 A1 * | 4/2008 | F16C 19/56 |

* cited by examiner

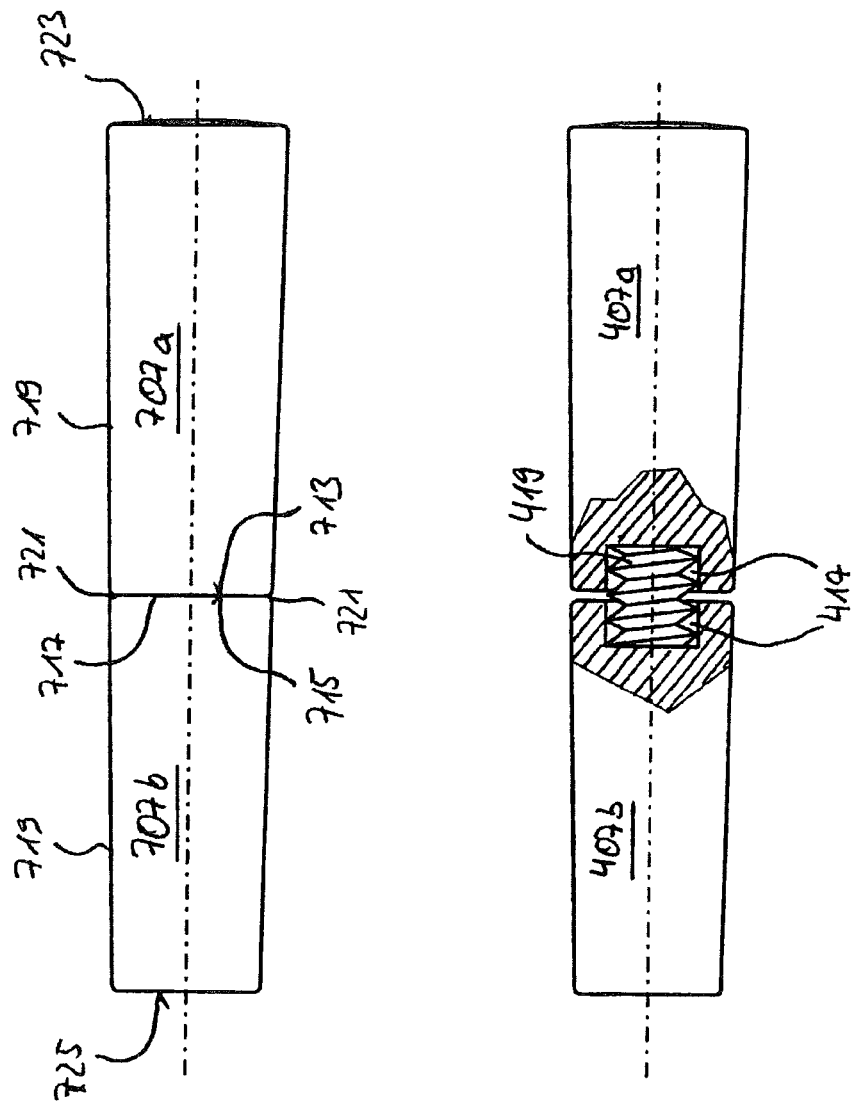

MULTI-ROW TAPERED ROLLER BEARING AND TRANSMISSION HAVING SUCH A BEARING

CROSS-REFERENCE

This application is the U.S. National Stage of International Application No. PCT/EP2011/054203 filed on Mar. 21, 2011, which claims priority to German patent application no. 10 2010 013 627.1 filed on Apr. 1, 2010.

TECHNICAL FIELD

The present invention relates to a bearing assembly and a transmission.

RELATED ART

When used in transmissions, tapered roller bearings are often used when high loads occur. This is particularly the case for wind turbines. Since the planetary transmissions there are exposed to constantly changing loads comprised of axial and radial load components, tapered roller bearings have particular advantages here, as both loads can be supported by the same rolling elements. For example, bearings having two rows of tapered rollers are known, which can be disposed in the so-called X- or O-arrangement.

Roller bearings having two rows, for example having tapered rollers, are often used for supporting high loads, wherein the rollers have a correspondingly large diameter. Alternatively it is appropriate for example to use more than two rows of tapered roller bearings. Bearing assemblies having four or more rows of tapered rollers are already known from the prior art. Thus for example a tapered roller bearing is known from U.S. Pat. No. 2,130,258 that has up to six rows of tapered rollers. The inner ring of the tapered roller bearing is formed as one piece and has a separate incorporated raceway for each row of the tapered rollers. The outer ring is formed in a divided manner in each case, so that the mountability of the tapered roller bearing is ensured. The tapered rollers are disposed adjacently in different orientations, so that the tapered roller bearing can be designed in accordance with the specific application. In principle the individual rows of the tapered rollers of the bearing could be designed as separate, axially adjacently disposed tapered roller bearings.

SUMMARY

It is an object of the present teachings to disclose a bearing assembly and a transmission, which for high load ratings are comparatively simple and inexpensive to manufacture.

In one aspect of the present teachings, a bearing assembly has the following features:
- at least three raceway elements,
  wherein at least two of the raceway elements are disposed axially one-behind-the-other and each radially oppose the third raceway element,
- at least three rows of truncated-cone-shaped rolling elements,
  wherein at least two of the rows are disposed between the first and the third raceway elements, and at least a third of the rows is disposed between the second and the third raceway element,
- the third raceway element has a first raceway, on which the rolling elements of the two rows commonly roll,
- the third raceway element has a second raceway, on which the rolling elements of the third row roll, and
  wherein the two raceways are formed separately.

By providing at least three rows of rolling elements, high loads can be borne with the inventive bearing assembly. By using more than two rows of the rolling elements, for the same load rating the rolling elements can be manufactured with smaller diameters in comparison to bearing assemblies having two rows, which reduces the manufacturing costs. The rows can for example be disposed axially one-behind-the-other, wherein the rolling elements of adjacent rows can touch. Also, the rows can be spaced.

By using the shared third raceway element, the number of the components used can be reduced overall. In this respect the bearing assembly is manufacturable with reduced expense in comparison to known embodiments. A design of the invention is advantageous in that the two rows of rolling elements are disposed in an X- or O-arrangement relative to the third row. In particular the use of the shared third raceway element is of advantage in such an arrangement, since the use of separate raceway elements results in manufacturing tolerances concerning the axial dimensions, which must be considered during the pairing of the components. In the bearing assembly according to the embodiments of the invention, only axial tolerances of the first and second raceway elements need to be considered. Here the formation of two raceway elements, which radially oppose the raceway elements, is required for the mounting of the bearing assembly. Thus the rows of the rolling elements can first be premounted on the first or second raceway element, optionally with a rolling-element-guiding cage, and then inserted axially from outside into the third raceway.

The first and second raceway elements each have raceways on which the rolling elements roll, which rolling elements are respectively disposed between these raceways and the third raceway element. Consequently the first raceway element has two raceways for the rolling elements of the two rows, and the second raceway element has at least one raceway for the rolling elements of the third row.

With an O-arrangement of the rolling elements, for simple assembly of the bearing assembly the third raceway element is formed as an outer ring and the first and second raceway element are each formed as an inner ring. With an X-arrangement of the rolling elements, the third raceway element is formed as an inner ring and the first and second raceway element are each formed as an outer ring.

In an advantageous design of the invention, a fourth row of rolling elements is disposed axially adjacent to the third row of rolling elements, so that for example a symmetrical arrangement of the rolling elements with respect to the first and second rows of the rolling elements and the axial center of the bearing assembly results. The rolling elements of the fourth row commonly roll, for example, on the second raceway of the third raceway element. Thus results a bearing assembly that is balanced with respect to the load bearing capacity.

The raceway elements are formed as one piece in the area of the shared raceway, so that the two rows of the rolling elements can for example roll directly adjacent to each other on the shared raceway. Thus the portion of the respective raceway element having the shared raceway is formed as one piece, i.e. designed in a not axially discontinuous manner.

In a preferred embodiment of the invention, a shared cage for guiding the rolling elements is provided for the two rows of rolling elements, which rows of rolling elements roll on the shared raceway. This makes possible a particularly space-saving embodiment of the bearing assembly in comparison to known, multi-row bearing assemblies, in which each row of the rolling elements is guided by a separate cage. Existing installation space can thus be used to install larger or longer rolling elements, which allows a maximization of the load rating of the bearing assembly.

In a preferred embodiment of the invention, the raceways on the first and/or second raceway element are axially spaced and/or are each bordered by a flange. The rolling elements can be guided on the flange(s). Moreover, this optimizes the running properties of the bearing assembly, in particular for high loads in the axial and radial directions. Also in this embodiment adjacent rows can be guided with a shared cage.

In an alternative embodiment of the invention, the raceways in the first raceway element, on which the rolling elements of the two rows roll, are also designed as a shared raceway. This embodiment of the first raceway element consequently has a raceway that is designed comparably to the third raceway element. In embodiments of the inventions in which a fourth row of rolling elements is provided, the raceways of the second raceway element can be formed in a corresponding manner.

In a preferred embodiment of the invention, raceways formed on the respective raceway element are formed in an aligned manner for adjacent rows of the rolling elements. Consequently the raceways of the respective raceway elements lie on the surface of the same geometric body. A comparable arrangement with respect to the shared or aligned raceway results at each opposing raceway element. The aligned arrangement of the individual raceways, like the continuous embodiment of the shared raceways, also has the effect that adjacent rolling elements circulate with the same angular velocity. It is thereby ensured in particular that adjacent rows of rolling elements guided in a shared cage do not apply any forces to the cage, which forces would come into existence due to different angular velocities, so that the wear is minimized.

In a preferred embodiment of the invention, rolling elements rolling on a shared raceway are disposed directly adjacently. In this case, adjacent rolling elements are adjacently disposed, preferably in an individual pocket of the cage. In this case the raceways need to be designed continuously on the outer ring and inner ring, i.e. as a shared raceway. An additional utilization of space hereby results for the further increase of the load rating of the bearing assembly, which space, in other exemplary embodiments, is located between the rolling elements. Moreover, in this embodiment the cage is designable in a particularly simple manner. Then two of the rolling elements are located in each bearing pocket.

In a preferred embodiment of the invention, the mutually facing end sides of the directly adjacent rolling elements have a planar region. The rolling elements can then be disposed in such a way that each two adjacently lying rolling elements touch. With a predominantly planar design of the end sides, the available space can be optimally utilized. Due to the identical angular velocity of adjacent rolling elements, no relative movement of the rolling elements occurs, so that no frictional losses occur. Moreover, even in the case of touching rolling elements, wear through increased abrasion on the end sides is ruled out. Preferably, however, the end sides have a slight rounding at the transitions to the contact surfaces of the rolling elements, so that no edge stresses occur if the rolling elements for example tilt slightly crosswise. This could be the case with completely planar-formed end sides.

In a preferred embodiment of the invention, rolling elements that roll on a shared raceway are disposed in a spaced manner, and in each case at least one spacing element is provided between them. The spacing element can for example serve to guide the rolling elements.

In a preferred embodiment of the invention, the rolling elements disposed in a spaced apart manner each have opposing blind holes in the end sides that face towards each other, and opposite ends of the spacing element are disposed in the opposing blind holes. In this embodiment a relatively high proportion of the available installation space can also be used to increase the load rating. By providing a small spacing between the rolling elements, the bearing assembly can also be equipped with rolling elements with a lesser dimensional accuracy in comparison to the directly adjacent rolling elements. The spacing element can for example be designed as a spring element that applies a defined preload to the adjacent rolling elements. They can thus press for example against axially outward-lying flanges.

In a preferred embodiment of the invention, opposing rows of the rolling elements are disposed in the O-arrangement with respect to the axial center of the bearing assembly. The tapered rollers are consequently all disposed in such a way that they taper towards the axial center of the bearing assembly. Here for example the outer ring can be formed as one piece, while the inner ring is two-part. Through the formation in the O-arrangement, it is possible in a simple way to give the bearing assembly a defined preload, which is required for operation. Also a simple mounting is ensured, since for example the first and second raceway element having the already-mounted rolling elements and the cages, can be pushed in a simple way into the third raceway element. The preload can be adjusted by tensioning first and second raceway element against each other in a defined way. Alternatively the bearing assembly can be designed in the X-arrangement, wherein the third raceway element is then formed as the inner ring, while the first and second raceway elements are formed as outer rings. The preferred design thereby depends on the application. Consequently, embodiments of the invention can be used in diverse ways.

In a preferred embodiment of the invention, the rows of the rolling elements have at least partially different cone angles. Thus it is preferably possible to dispose two rows on one axial side of the bearing assembly, which two rows have cone angles that are more acute than on the opposite side. This leads to a partition of the axial and radial loads on the respective sides of the rolling-element bearing. Here the side having rolling-elements of the smaller cone angle supports a higher proportion of the radial loads, while the side with the larger angle supports a higher proportion of the axial forces.

In a further aspect of the present teachings, a transmission for use in a wind turbine may include at least one bearing assembly according to any preceding or subsequent embodiment. The bearing assembly according to the present teachings can be used particularly advantageously for example in planetary transmissions of wind turbines, since especially high load ratings are required here for a simultaneously limited installation space.

Further advantages and designs of the invention result from the exemplary embodiments explained in the following in conjunction with the appended Figures.

BRIEF DESCRIPTION OF THE DRAWINGS

FIG. 8 shows the rolling elements according to third, fourth and seventh embodiments of the present teachings in greater detail.

FIG. 9 shows the rolling elements according to fifth embodiment of the present teachings in greater detail.

DETAILED DESCRIPTION OF THE INVENTION

Figure 1:
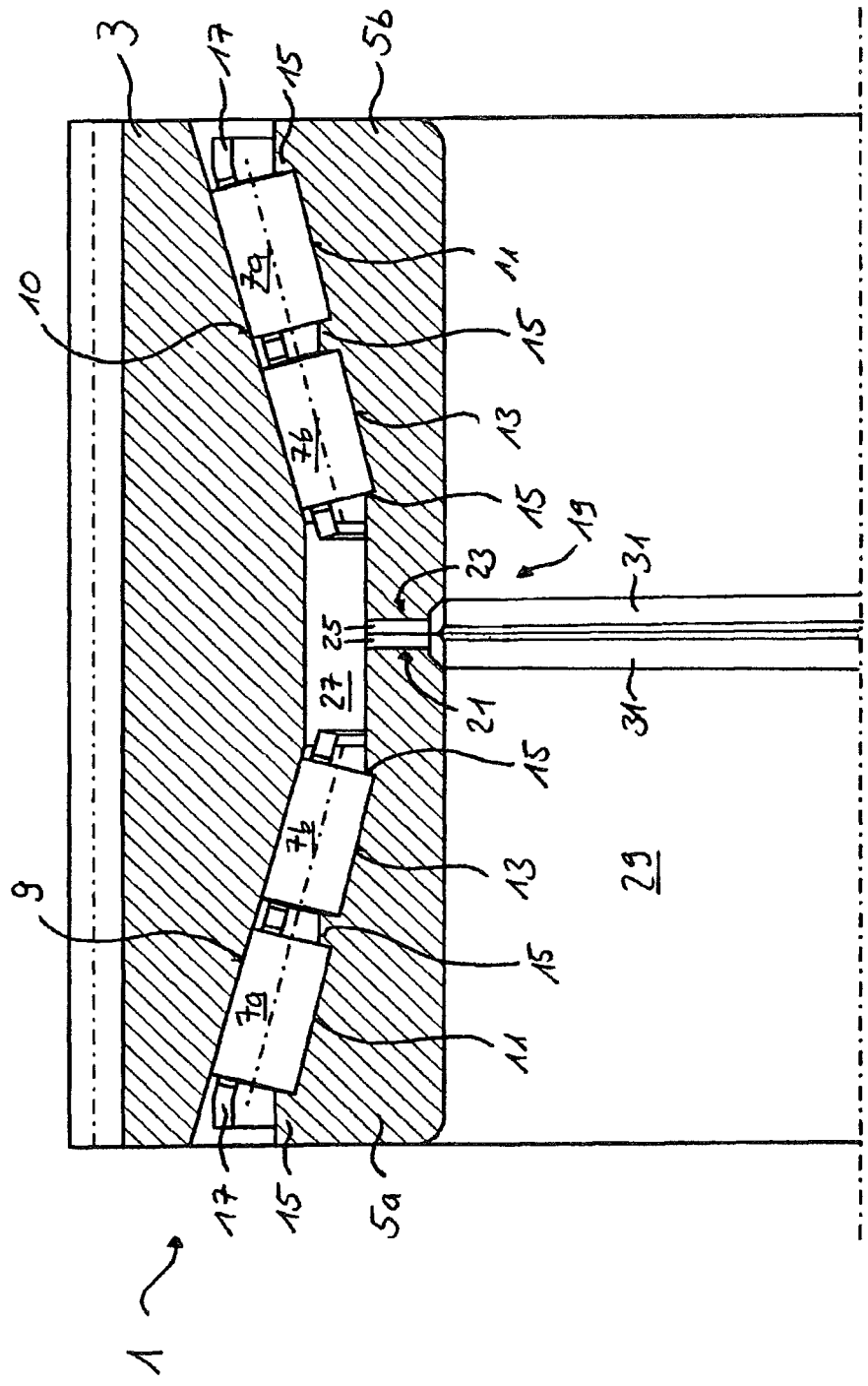
FIG. 1 shows a bearing assembly according to a first embodiment of the present teachings.

In FIG. 1 a first exemplary embodiment of the invention is depicted. A bearing assembly 1 comprises an outer ring 3 and two inner rings 5a and 5b. Two rows of tapered rollers 7a and 7b are disposed between the outer ring 3 and the inner ring 5a. Two rows of tapered rollers 7a and 7b are likewise disposed between the outer ring 3 and the inner ring 5b. In the present exemplary embodiment, all tapered rollers 7a are identical in shape and size, however different from the shape and size of the tapered rollers 7b. All tapered rollers 7b are in turn identical in shape and size. Through the one-piece design of the outer ring 3 it is effectively avoided that tolerances of a plurality of components, as necessarily occurs with known embodiments, add up, and thus the required precision would no longer be ensured.

The outer ring 3 comprises two raceways 9 and 10, on which the tapered rollers 7a and 7b respectively roll. The raceways 9 and 10 are each formed continuously in the outer ring 3. The rolling elements 7a and 7b, which each roll on the raceways 9 and 10, respectively, are thus disposed on the raceway in such a way that their outer sides are disposed in an aligned manner relative to each other. In the inner rings 5a and 5b, a single raceway 11 or 13 is provided for each row of the tapered rollers 7a and 7b. The raceways 11 and 13 are respectively bordered by flanges 15. In particular the tapered rollers 7a and 7b are spaced by the middle of the flanges 15. During operation of the bearing assembly 1, the flanges 15 serve to guide the tapered rollers 7a and 7b. In addition, cages 17 are also provided for further guiding of the tapered rollers. Preferably here a shared cage 17 is associated with each of the adjacently disposed tapered rollers 7a and 7b, whereby the bearing assembly 1 can be designed to be especially space-saving. In principle separate cages can be used for each row of tapered rollers 7a and 7b; however these require more space.

The tapered rollers 7a and 7b have the same cone angle, as is apparent from FIG. 1. Adjacent tapered rollers 7a and 7b consequently have a common apex point. Below, the point is understood to be the point in which lines intersect that lie outwardly on the tapered rollers and are oriented in the direction of their taper. However the tapered roller 7b is formed smaller than the tapered roller 7a. This results not only in that the raceway 9 or 10 is provided to flushly abut the rolling elements, but also that the raceways 11 and 13 are incorporated in the respective inner rings 5a and 5b in an aligned manner. In contrast to the raceway 9 or 10, the raceways 11 and 13 are however separated by the flange 15; i.e. they are not continuously formed.

The aligned formation of the mutually adjacent raceways 11 and 13 and the provision of only one common raceway 9 or 10 for two rows of tapered rollers 7a and 7b results in that adjacent tapered rollers 7a and 7b circulate with the same angular velocity when the bearing assembly 1 is in operation. Adjacent tapered rollers 7a and 7b thus always remain in the same relative position adjacent to each other, so that the guiding inside a shared cage 17 is possible.

The bearing assembly 1 has a system 19 of lubrication grooves. The inner rings 5a and 5b each have a groove 25 on their end sides 21 and 23 facing towards each other, which groove extends outward radially and thus connects the space 27 between the tapered rollers 7a with the space 29 inside the inner rings 5a and 5b. The inner rings 5a and 5a also each have a circumferential groove 31 which is connected with the respective groove 25. During mounting of the bearing assembly 1, the inner rings 5a and 5b are retained in the space 29 for example on a shaft or a stationary pin. Via the circumferential groove 31 and the radially-outwardly-extending groove 25, the lubricant can be brought from the space 29 into the space 27, which lubricant can be used for the lubrication of the bearing assembly 1.

Figure 2:
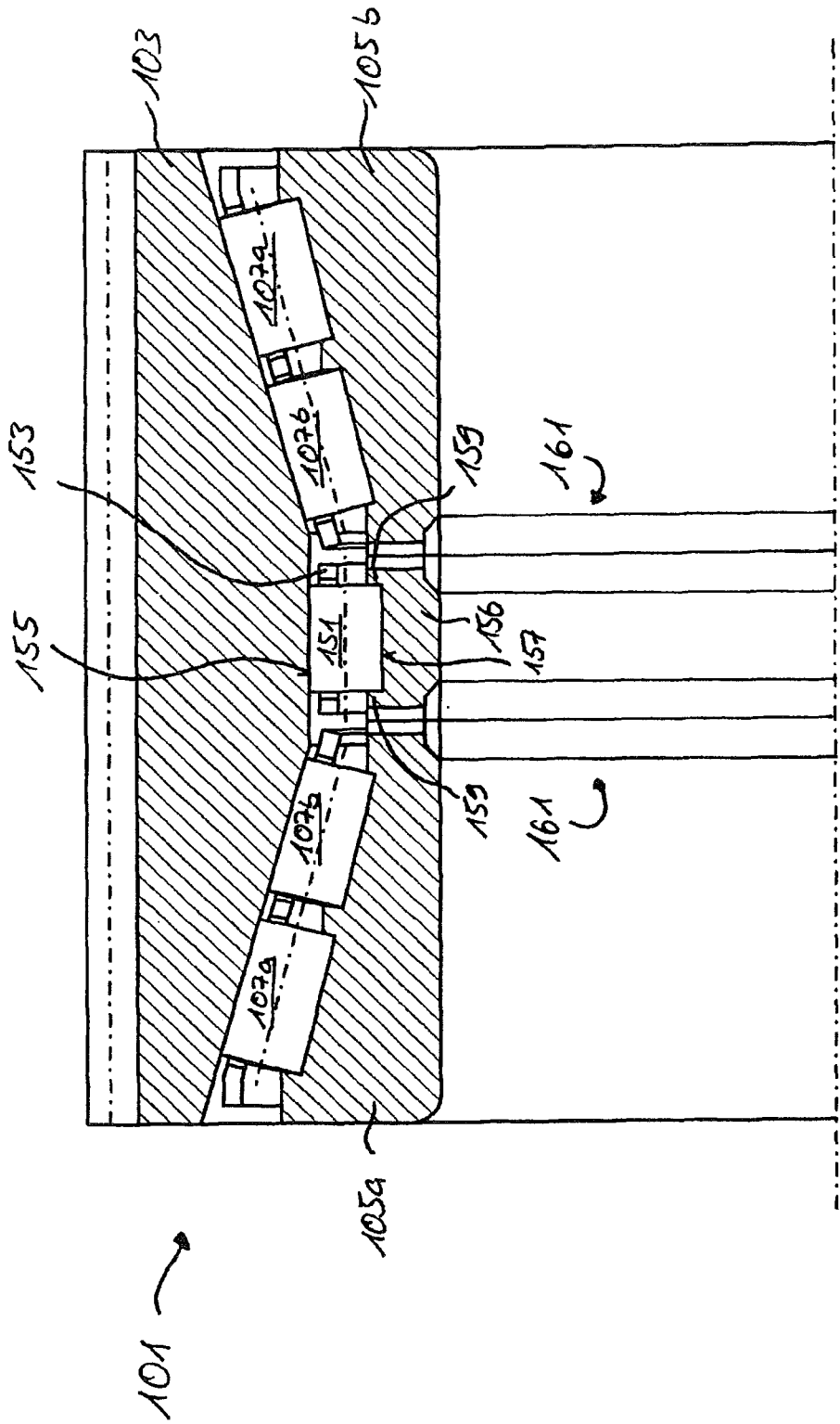
FIG. 2 shows a bearing assembly according to a second embodiment of the present teachings.

In FIG. 2 an alternative embodiment of the invention is depicted. The bearing assembly 101 shown is constructed largely analogously to the embodiment of FIG. 1. Thus the bearing assembly 101 also has an outer ring 103, as well as inner rings 105a and 105b. Tapered rollers 107a and 107b are disposed between the outer ring 103 and the two inner rings 105a and 105b, in an analogous arrangement to the exemplary embodiment of FIG. 1. Between the two rows of the tapered rollers 107b, the bearing assembly 101 includes a row having cylindrical rollers 151. The cylindrical rollers 151 are guided by a cage 153. A raceway 155 for the cylindrical rollers 151 is correspondingly formed centrally in the outer ring outer ring 103. The bearing assembly 101 has a further inner ring 156, which is disposed between the inner rings 105a and 105b. The inner ring 156 has a raceway 157 on which the cylindrical rollers 151 roll. Two flanges 159 are formed in the inner ring 156 axially adjacent to the raceway 157 for the guiding of the cylindrical rollers 151. A lubrication system 161 analogous to the embodiment of FIG. 1 is respectively formed between the inner ring 156 and the inner ring 105a and the inner ring 105b.

By providing the cylindrical rollers 151, even larger radial loads can be supported with the bearing assembly 101 than with the bearing assembly 1 depicted in FIG. 1. In order to be able to support even larger radial loads, it is also possible to provide a plurality of cylindrical rollers 151 between the tapered rollers 107b. Further inner rings 156 can also be provided, but a plurality of raceways 157 can also be formed adjacent to each other in the inner ring 156. In this case the inner ring 156 would possibly be designed wider. Alternatively the raceway 157 for the cylindrical rollers 151 could also be formed on one of the inner rings 105a or 105b, which would then have to be extended axially in an appropriate manner. In this case the overall arrangement would be asymmetrically divided with respect to the layout of the inner ring.

Figure 3:
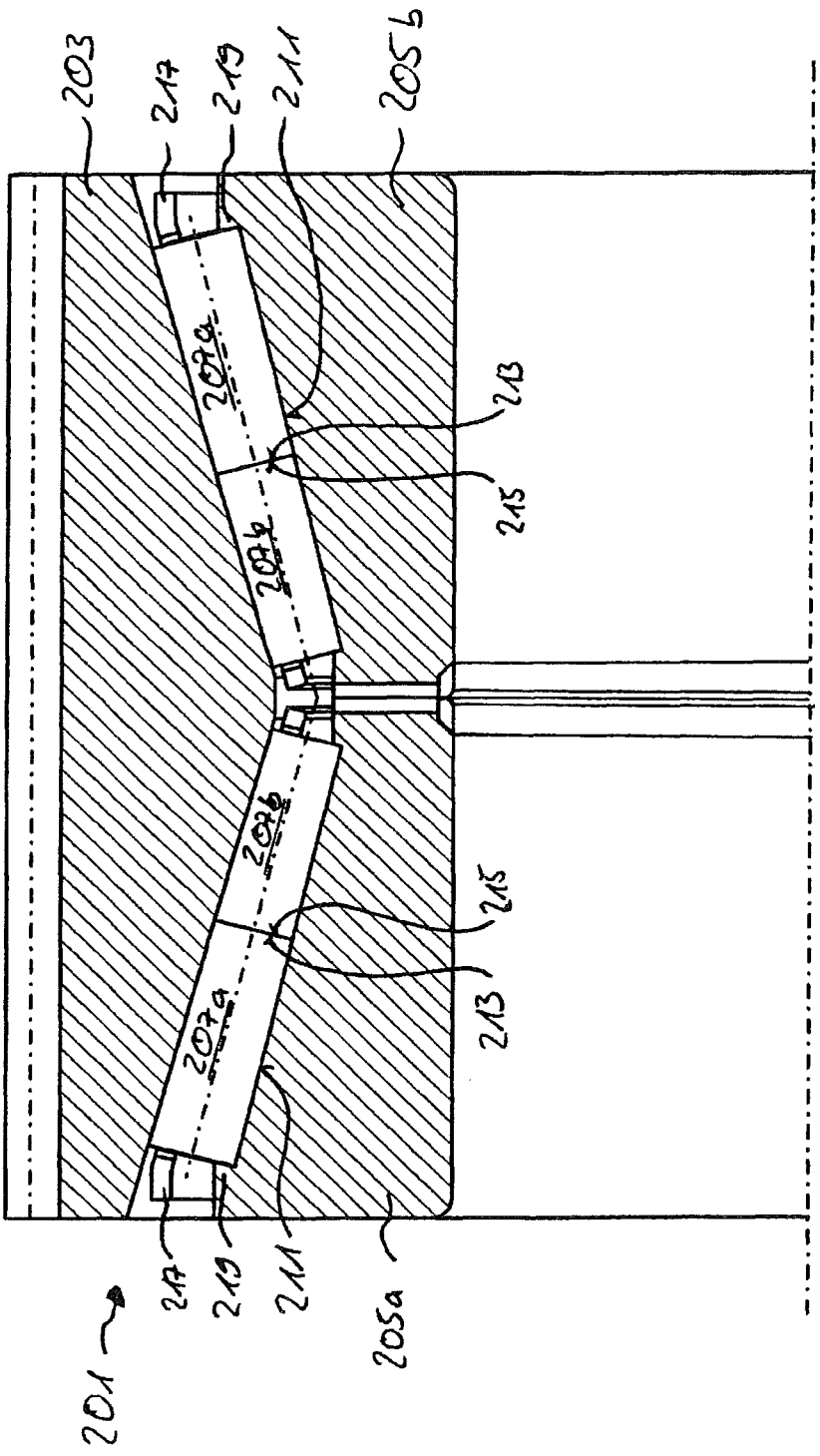
FIG. 3 shows a bearing assembly according to a third embodiment of the present teachings.

In FIG. 3, a bearing assembly 201 is depicted which again resembles the embodiments of FIGS. 1 and 2. The bearing assembly 201 has an outer ring 203 which has a continuous raceway for tapered rollers 207a and 207b. Inner rings 205a and 205b are also provided. The rolling elements 207a and 207b are each guided by a shared cage 217. In contrast to the exemplary embodiments of FIGS. 1 and 2, the inner rings 205a and 205b of the bearing assembly 201 also have a shared running surface 211 for the tapered rollers 207a and 207b. The tapered rollers 207a and 207b are directly adjacently disposed in the bearing assembly 201, so that their end faces 213 and 215 touch. Accordingly, the end face 213 of the tapered rollers 207a and the end face 215 of the tapered rollers 207b have a planar portion, which will be explained with the assistance of FIG. 8. This results in the best possible contact surface between the tapered rollers 207a and 207b. Two flanges 219 are respectively formed on the inner rings 205a and 205b for guiding the tapered rollers 207a and 207b.

Since the tapered rollers 207a and 207b each circulate, analogously to the other exemplary embodiments, with the same angular velocity, with respect to directly adjacent tapered rollers 207a and 207b, relative motion occurs that is at most negligible in the form of tilting crosswise, i.e. a reciprocal tilting. Adjacent tapered rollers 207a and 207b do not, however, run apart from each other during operation of the bearing assembly. At the contact of the end faces 213 and 215, there is thus no relative movement and thus also no friction which could lead to running losses and wear. The bearing assembly 201 has the advantage of optimally exploiting the available installation space for achieving a high load rating. In comparison to the exemplary embodiments of FIGS. 1 and 2, the tapered rollers 207a and 207b are designable to be longer for the same outer dimensions of the bearing assembly, since the space located between the tapered rollers is used.

Figure 4:
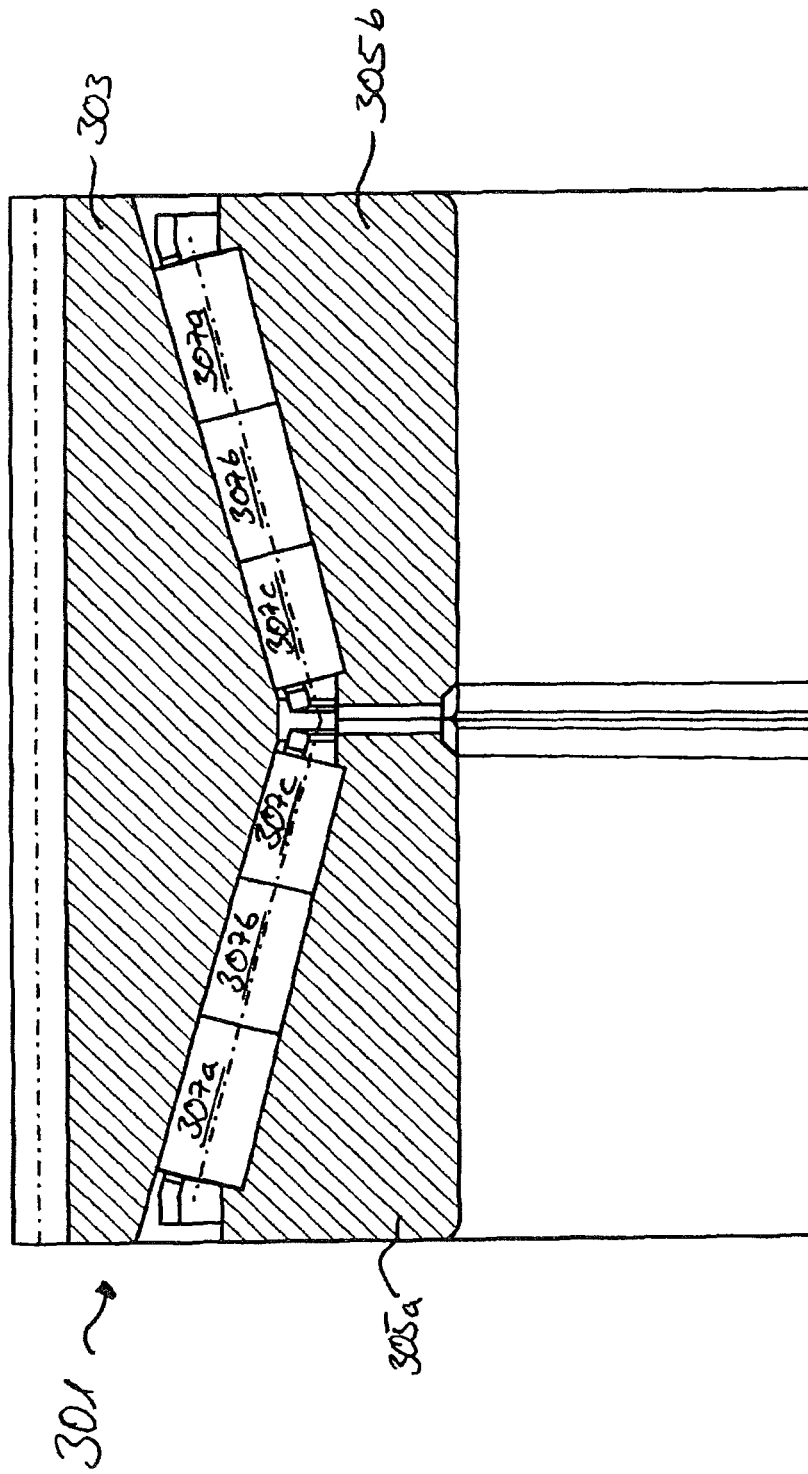
FIG. 4 shows a bearing assembly according to a fourth embodiment of the present teachings.

In FIG. 4, a bearing assembly 301 is depicted. It corresponds to the exemplary embodiment of FIG. 3 with respect to the basic design of the outer ring 303 and the inner rings 305a and 305b. However, in contrast thereto, the bearing assembly 301 has six rows of tapered rollers 307a, 307b and 307c in total. In this case, three rows of tapered rollers 307a, 307b and 307b lie directly adjacent to each other on each side of the bearing assembly 301 and roll on a shared running surface on the outer ring 303 or on the inner ring 305a and 305b. The tapered rollers 307a, 307b and 307c are thus designed to be shorter than the corresponding tapered rollers 207a and 207b of FIG. 3. Alternatively the outer ring 303 and the inner rings 205a and 205b could be designed to be longer for comparable sizes of the tapered rollers 307a, 307b and 307c.

Figure 5:
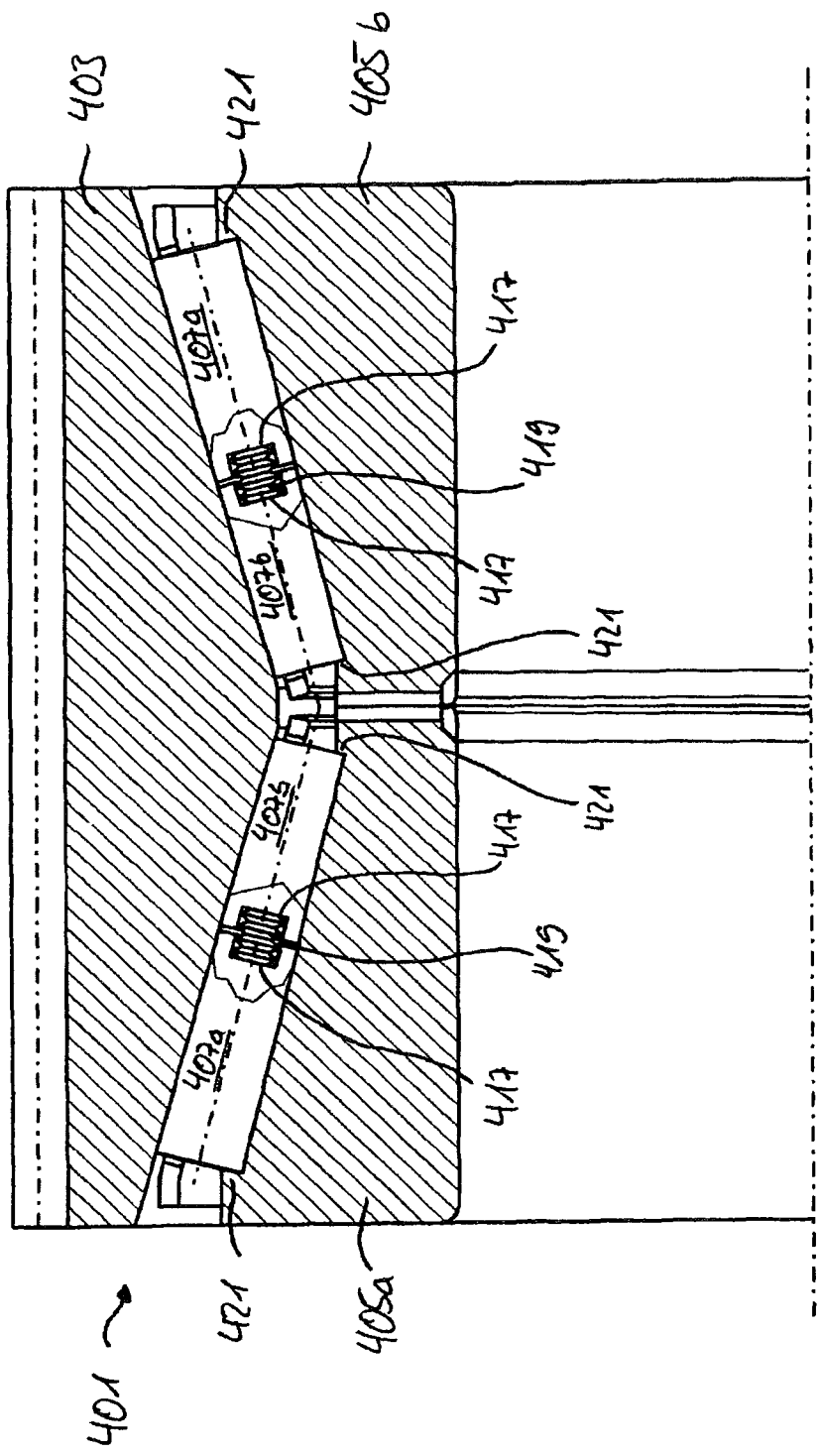
FIG. 5 shows a bearing assembly according to a fifth embodiment of the present teachings.

In FIG. 5, a further exemplary embodiment of the invention is depicted. The bearing assembly 401 shown again corresponds to the exemplary embodiment of FIG. 3 with respect to the design of the outer ring 403 and the inner rings 405a and 405b. Analogously to the exemplary embodiment of FIG. 3, four rows of tapered rollers 407a and 407b are provided in total, which roll on the outer ring 403 and on the inner ring 405a and 405b on shared running surfaces. In contrast to the exemplary embodiment of FIG. 3, adjacent tapered rollers 407a and 407b have a slight spacing with respect to their end sides. The tapered rollers 407a and 407b have blind holes 417 on the opposing end sides. A spring element 419 is retained in each of the blind holes 417, so that adjacent tapered rollers 407a and 407b are held at a constant spacing. The spring element 419 can for example be designed as a metallic spring or made from an elastomer.

Due to the spring element 419, the directly adjacent tapered rollers 407a and 407b push away from each other with a predefined preload force, so that they abut against the respective flanges 421 of the inner rings 405a and 405b. The spring element 419 thus supports the forces which are applied to the flange 15 between the tapered rollers 7a and 7b in the exemplary embodiment of FIG. 1. The spring force should be chosen such that, for normal to maximum loads on the bearing assembly 401, the spring force corresponds approximately to a virtual flange load applied by the tapered roller 407b. Due to the cone-shaped design of the tapered rollers 407a and 407b and the design of the raceways matched thereto, each raceway of the outer ring 403 is not parallel to the respective opposing raceway of the inner ring 405a and 405b. Consequently the forces applied by the corresponding raceways to the outer surface of the tapered rollers 407a and 407b also do not act in parallel. Therefore, a resulting force on the tapered rollers 407a and 407b arises, by which these tapered rollers are pushed outward along the raceways. This force is counterbalanced by the outer-lying flange 415 with respect to the tapered rollers 407a. With respect to the tapered rollers 407b the force is analogously counterbalanced by the corresponding outer-lying spring element 419.

By introducing the spring element 419 into the blind holes 417 in the tapered rollers 407a and 407b, the bearing assembly 401 can be designed with tapered rollers of lesser dimensional accuracy than in the exemplary embodiments of FIGS. 3 and 4, where the tapered rollers lie directly against each other. But in comparison to the embodiments of FIGS. 1 and 2, an even greater part of the installation space located between the tapered rollers 7a and 7b is used to increase the load rating.

In addition, the spring elements 419 can be dimensioned such that they stay in the blind holes 417. Consequently, adjacent tapered rollers 407a and 407b can be held together and aligned relative to each other by the spring element 419 inserted between them. Additionally this facilitates mounting.

Figure 6:
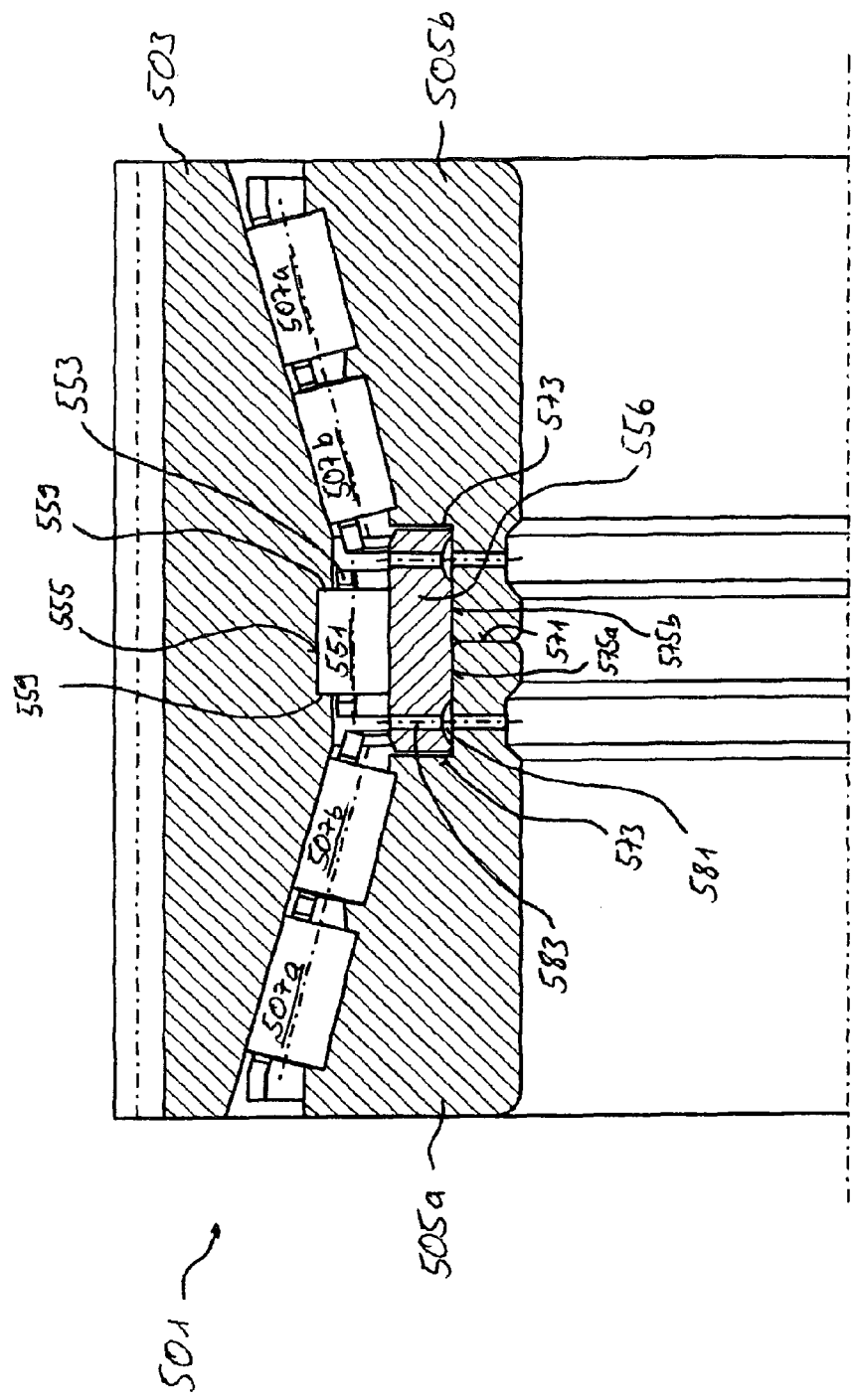
FIG. 6 shows a bearing assembly according to a sixth embodiment of the present teachings.

In FIG. 6, a bearing assembly 501 is depicted as a further exemplary embodiment. It resembles the embodiment of FIG. 2 with respect to the arrangement of the tapered rollers 507a and 507b. However, the implementation of the central cylindrical roller bearing is different in comparison to the design of FIG. 2. Thus the inner rings 505a and 505b are designed in such a way that they have a contact surface 571. In this respect the preload of the tapered roller bearing is necessarily set by the dimensions of the inner rings 505a and 505b. In FIG. 2 the inner ring belonging to the cylindrical roller bearing also had to be considered in this respect.

In the area of the contact surface 571, the inner rings 505a and 505b have recesses 573. An inner ring 556, on which cylindrical rollers 551 roll, is disposed within the recesses 573, which inner ring axially overlaps the two inner rings 505a and 505b. The cylindrical rollers 551 are guided by a cage 553 and also roll on a raceway 555 formed in the outer ring 503. The raceway 555 is disposed offset radially outward in outer ring 503, so that two flanges 559 result for lateral guiding of the cylindrical rollers 551. Due to the design of the cylindrical roller bearing, which lies radially farther outward in the bearing assembly 501 in comparison to the variant of FIG. 2, the roller pitch circle is larger here, so that larger radial loads can be borne by the cylindrical roller bearing.

The inner ring 556 overlaps the inner rings 505a and 505b on contact surfaces 575a and 575b, respectively. Laterally, however, the inner ring 556 has a spacing to the inner rings 505a and 505b. Preferably, the inner ring 556 has a press-fit onto the contact surfaces 575a and 575b, so that the inner rings 505a and 505b are no longer axially displaceable. A corresponding preload applied to the tapered rollers 507a and 507b is maintained due to the press-fit of the components. The inner ring 556 consequently holds the bearing assembly 501 together axially.

The inner ring 556 has grooves 581 and bores 583, which, analogously to the embodiments of FIGS. 1 to 5, can transport lubricant to the cylindrical rollers 551 and the tapered rollers 507a and 507b.

Figure 7:
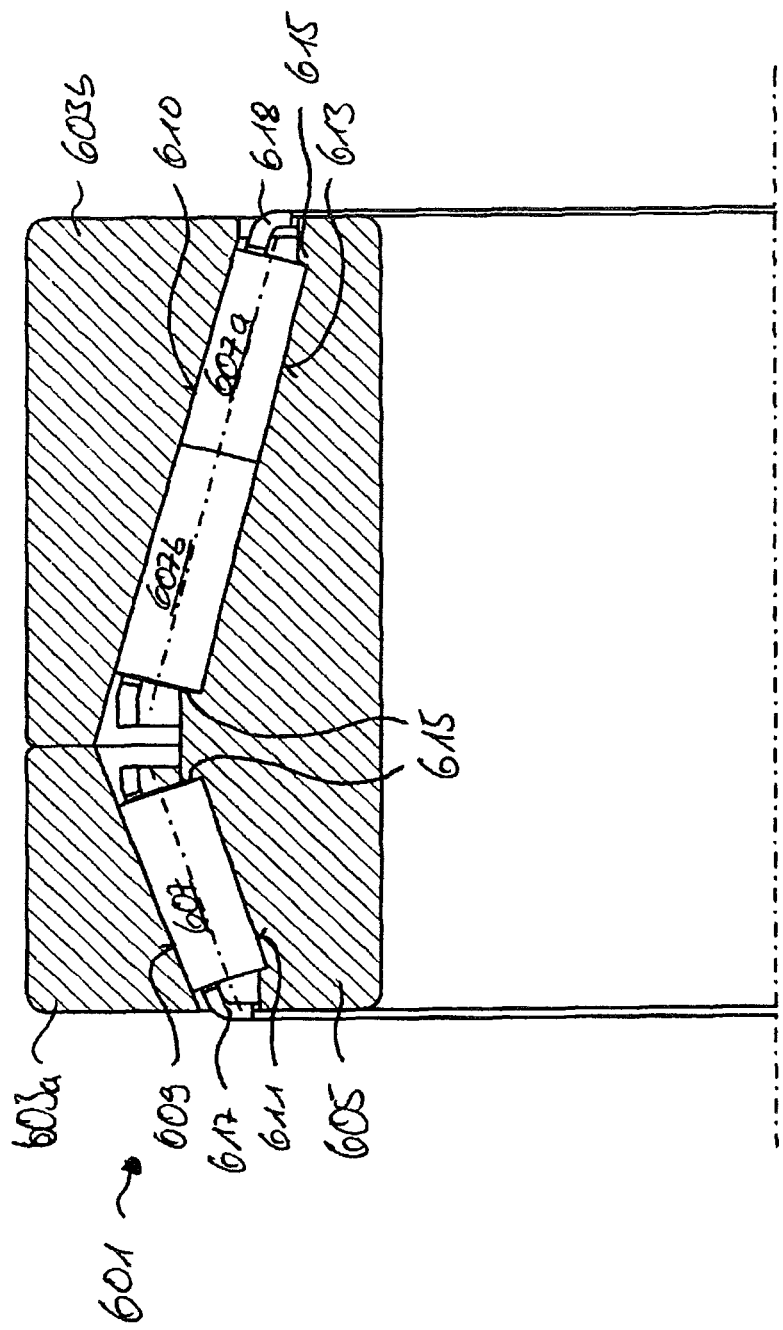
FIG. 7 shows a bearing assembly according to a seventh embodiment of the present teachings.

A further exemplary embodiment of the invention is depicted in FIG. 7. A bearing assembly 601 has two outer rings 603a and 603b. In addition, the bearing assembly 601 has an inner ring 605. A row of tapered rollers 607 is disposed between the outer ring 603a and the inner ring 605. Two rows of tapered rollers 607a and 607b are disposed between the outer ring 603b and the inner ring 605. The outer ring 603 has a running surface 609 on which the tapered rollers 607 roll.

Likewise the inner ring 605 has a running surface 611, on which the tapered rollers 607 roll. The outer ring 603b has a shared running surface 610 on which the tapered rollers 607a and 607b roll. The inner ring 605 has a raceway 613, on which the tapered rollers 607a and 607b likewise roll. In contrast to the exemplary embodiments of FIGS. 1 to 6, the tapered rollers 607 and 607a and 607b of the bearing assembly 601 are disposed in an X-arrangement. In addition the bearing assembly 601, in contrast to the exemplary embodiments of FIGS. 1 to 6, has only three rows of rolling elements. Three-row embodiments would also be possible in the exemplary embodiments of FIGS. 1 to 6. Likewise, in an alternative embodiment of bearing assembly 601 it would be possible to provide, analogously to the axially opposing side, a further row of tapered rollers adjacent to the tapered rollers 607, so that a four-row tapered roller bearing also results here.

The tapered rollers 607 are guided by a cage 617. Analogously to the previously explained exemplary embodiments, the tapered rollers 607a and 607b are guided by a shared cage 618. This is possible, inter alia, by rolling both tapered rollers 607a and 607b on a shared running surface 610 and 613, and thus, analogously to the exemplary embodiments above, by circulating with the same angular speed. Alternatively it would be possible, analogously to the exemplary embodiments of FIGS. 1 to 6, to interrupt the raceway 610 or 613 with a flange lying between the tapered rollers 607a and 607b. The two, thus-resulting raceways for the tapered rollers 607a and 607b would in this case likewise have to be oriented aligned relative to each other.

The tapered rollers 607a and 607b have the same cone angle and are merely designed with different diameters. Both the tapered rollers 607 and the pair of tapered rollers 607a and 607b are guided by a flange 615, which is correspondingly formed on the inner ring 605.

In FIG. 8 a pair of tapered rollers 707a and 707b is depicted. The tapered rollers 707a and 707b are usable in the exemplary embodiments of FIGS. 3, 4 and 7 in a corresponding manner. They are directly adjacently disposed and have a planar region 717 on the mutually-facing end sides 713 and 715, respectively. The tapered rollers 707a and 707b have a rounded profile 721 at the transition to the running surfaces 719. The outer-lying end sides 723 and 725 of the tapered rollers 707a and 707b, respectively, are formed in such a way that an optimal guiding against the flange of the respective inner ring or outer ring can be achieved. Taken together, the tapered rollers 707a and 707b correspond to a continuous tapered roller having a correspondingly greater length in relation to the diameter. Since, due to physical constraints, a lengthy tapered roller of this type would not be capable of a uniform bearing of the load of the bearing, it is necessary to use two tapered rollers 707a and 707b.

In FIG. 9 the tapered rollers 407a and 407b of the bearing assembly 401 from FIG. 5 are depicted in detail. The spacing of the end sides of the tapered rollers 407a and 407b in comparison to the two tapered rollers of FIG. 8 is to be recognized. Each of the tapered rollers 407a and 407b has a blind hole 417. A spring element 419 is disposed in the two blind holes 417 of the tapered rollers 407a and 407b. The tapered rollers 407a and 407b are maintained at the defined distance in accordance with the clamping force of the spring element 419, and are maintained between the flanges of the inner ring in a preloaded manner (cf. FIG. 5). The spring element 419 is dimensioned in the diameter such that it is retained in the blind holes 417. For this purpose it has, for example, a slight excess with respect to the diameter of the blind holes 417. In this way the tapered rollers 407a and 407b can not only be spaced in a defined manner, but also held together, so that the mounting can take place similar to a single continuous tapered roller. To ensure a largest possible spring function, it is likewise possible to house the spring element 419 in the blind holes 417 with little clearance.

For the assembly of the bearing assemblies depicted according to the figures it is first necessary to premount the respective tapered rollers on the respective inner ring and, in the case of the exemplary embodiment of FIGS. 2 and 6, to premount the cylindrical rollers on the respective inner ring, and to provide with the respective cages. Preferably, the cage lies outside the roller pitch circle in this case, so that a captive retention of the respective rolling elements on the respective inner ring results. Due to the chosen O-arrangement of the tapered rollers, it is possible to push, and thus to mount, the inner ring axially from outside into the outer ring, which inner ring is equipped with the rolling elements. This is possible in a simple manner due to the continuous raceways of the outer ring. In known embodiments it is necessary to mount the rollers individually.

Preferably, the embodiments of the invention can be used in transmissions of wind turbines. In this case, for example, the outer ring of the respective bearing assembly could be a component of a planetary gear, i.e. have gear teeth on its radially outer surface. Alternatively the respective outer ring can also be inserted into a hollow gear and thus can be made into a component of the respective planetary gear. The inner rings sit on a pin in a corresponding manner for mounting the planetary gear. The bearing assemblies are supplied with lubricant from the planetary transmission via the lubricant groove system.

In an alternative embodiment of the invention it is possible to select the cone angle or the pitch angle of the tapered rollers differently on the two axial sides of the bearing assembly. Thus for example the two rows of tapered rollers of the left side could be made flatter than those of the right side, whereby a partition of the axial and radial loads to the different halves of the halves of the bearing assembly would result. Likewise different pressure angles, i.e. nominally different angles of the outer raceway, on both sides of the bearing assembly can be selected.

REFERENCE NUMBER LIST

I Bearing assembly
3 Outer ring
5a, 5b Inner ring
7a, 7b Tapered roller
9 Raceway
10 Raceway
II Raceway
13 Raceway
15 Flange
17 Cage
19 Lubricant groove system
21 End side
23 End side
25 Groove
27 Space
29 Space
31 Groove
101 Bearing assembly
103 Outer ring
105a, 105b Inner ring
107a, 107b Tapered roller
109 Raceway
110 Raceway
117 Cage 151 Cylindrical roller
153 Cage
155 Raceway
156 Inner ring
157 Raceway
159 Flange
161 Lubricant groove system
201 Bearing assembly
203 Outer ring
205a, 205b Inner ring
207a, 207b Tapered roller
211 Running surface
213 End side
215 End side
217 Cage
219 Flange
301 Bearing assembly
303 Outer ring
305a, 305b Inner ring
307a, 307b Tapered roller
307c
401 Bearing assembly
403 Outer ring
405a, 405b Inner ring
407a, 407b Tapered roller
415 Flange
417 Blind hole
419 Spring element
421 Flange
501 Bearing assembly
503 Outer ring
505a, 505b Inner ring
507a, 507b Tapered roller
551 Cylindrical roller
553 Cage
555 Raceway
556 Inner ring
559 Flange
571 Contact surface
573 Recess
575a, 575b Contact surface
581 Groove
583 Bore
601 Bearing assembly
603a, 603b Outer ring
605 Inner ring
607a, 607b Tapered roller
609 Running surface
610 Running surface
613 Raceway
615 Flange
617 Cage
618 Cage
707a, 707b Tapered roller
713 End side
715 End side
717 Planar area
719 Running surface
721 Rounded profile
723 End side
725 End side

The invention claimed is:

1. A bearing assembly, comprising:
at least first, second and third raceway elements,
at least the first and second raceway elements are disposed axially adjacent to each other and each radially opposes the third raceway element,
at least first, second and third rows of truncated-cone-shaped rolling elements, wherein axially adjacent rollers in the first and second rows of truncated-cone-shaped rolling elements share a common center axis and have a same cone angle such that the axially adjacent rollers have a common apex point,
at least the first and second rows are disposed between the first and the third raceway element, and at least the third row is disposed between the second and the third raceway element,
the third raceway element has a first raceway, on which the rolling elements of the first and second rows commonly roll, and
the third raceway element has a second raceway, on which the rolling elements of at least the third row roll, and
the first and the second raceway elements are separable from each other,
a cage disposed between the first and third raceway elements such that the at least first and second rows of truncated-cone-shaped rolling elements are properly oriented relative to each other along the first raceway,
a lubrication groove positioned between the first and second raceway elements and configured to deliver lubricant between the first and second raceway elements.

2. The bearing assembly according to claim 1, wherein the first raceway element has at least two raceways for the at least first and second rows of rolling elements, respectively, wherein the at least two raceways are aligned.

3. The bearing assembly according to claim 2, wherein a separation element is disposed between the at least two raceways of the first raceway element.

4. The bearing assembly according to claim 3, further comprising a row of cylindrical rollers axially disposed between the first and second raceway elements.

5. The bearing assembly according to claim 3, wherein the separation element is a radially-extending flange.

6. The bearing assembly according to claim 2, wherein the at least two raceways of the first raceway element are formed as a shared raceway.

7. The bearing assembly according to claim 6, wherein directly axially adjacent rolling elements that roll on the shared raceway touch each other.

8. The bearing assembly according to claim 7, wherein the mutually facing end sides of the directly axially adjacent rolling elements are planar.

9. The bearing assembly according to claim 6, wherein directly axially adjacent rolling elements that roll on the shared raceway are disposed in a spaced manner and at least one spacing element is provided between them.

10. The bearing assembly according to claim 9, wherein mutually-facing end sides of the directly axially adjacent rolling elements disposed respectively have opposing blind holes that face towards each other, and opposite ends of the spacing element are respectively disposed in the opposing blind holes.

11. The bearing assembly according to claim 10, wherein the spring element comprises a spring that urges the directly axially adjacent rolling elements away from each other.

12. The bearing assembly according to claim 6, wherein the neighboring first and second rows of rolling elements on the shared raceway have the same cone angle.

13. The bearing assembly according to claim 1, further comprising a row of cylindrical rollers axially disposed between the first and second raceway elements.

14. The bearing assembly according to claim 1, wherein the neighboring first and second rows of rolling elements have the same cone angle.

15. The bearing assembly according to claim 14, wherein the rolling elements of the first row have a different diameter than the rolling elements of the second row.

16. A bearing assembly comprising:
- at least first, second and third raceway elements that are each separable from each other, the first and second raceway elements being disposed side-by-side in an axial direction of the bearing assembly and opposing the third raceway element in a radial direction of the bearing assembly, and
- at least first, second and third rows of truncated-cone-shaped rolling elements, the first and second rows being disposed between the first raceway element and the third raceway element and the third row being disposed between the second raceway element and the third raceway element,
- wherein axially adjacent rollers in the first and second rows of truncated-cone-shaped rolling elements share a common center axis and have a same cone angle such that the axially adjacent rollers have a common apex point,
- wherein the rolling elements of the first and second rows commonly roll on a first raceway of the third raceway element, and
- the rolling elements of the third row roll on a second raceway of the third raceway element, the second raceway is not parallel to the first raceway,
- a cage disposed between the first and third raceway elements such that the first and second rows of truncated-cone-shaped rolling elements are properly oriented relative to each other along the first raceway,
- a lubrication groove positioned between the first and second raceway elements and configured to deliver lubricant between the first and second raceway elements.

17. The bearing assembly according to claim 16, wherein the first and second rows of rolling elements respectively roll on first and second discrete, aligned raceways defined o the first raceway element.

18. The bearing assembly according to claim 17, further comprising a flange radially extending from the first raceway element between the first and second discrete, aligned raceways, the first and second rows of rolling elements each abuting the flange.

19. The bearing assembly according to claim 16, wherein the first and second rows of rolling elements roll on a shared, continuous raceway and axially-adjacent ends of the rolling elements abut each other.

* * * * *